United States Patent [19]

Ernst et al.

[11] 4,138,167  
[45] Feb. 6, 1979

[54] ROLLING BEARING INCLUDING LENGTHWISE CONVEX RACE RAILS

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 821,472

[22] Filed: Aug. 3, 1977

[30] Foreign Application Priority Data

Aug. 4, 1976 [DE] Fed. Rep. of Germany ....... 2635053

[51] Int. Cl.² ............................................. F16C 29/06
[52] U.S. Cl. ...................................... 308/6 C; 64/23.7
[58] Field of Search ............... 308/6 C, 6 A, 201, 15, 308/6 R, 73, 6 B, 194, 185, 72; 64/23, 23.7

[56] References Cited

U.S. PATENT DOCUMENTS

| | | | |
|---|---|---|---|
| 3,545,826 | 12/1970 | Magee et al. | 308/6 C |
| 3,844,629 | 10/1974 | Haines | 308/6 C |
| 3,900,233 | 8/1975 | Thomson | 308/6 C |

Primary Examiner—Trygve M. Blix  
Assistant Examiner—Douglas C. Butler  
Attorney, Agent, or Firm—Daniel M. Rosen

[57] ABSTRACT

A rolling bearing for lengthwise movement with respect to a shaft has a housing with a cage for guiding endless rows of rolling elements. Race rails extend axially in the housing for radially outwardly supporting rolling elements in the portions of the portions of the lengths of the rows thereof adapted to receive loads. The race rails have first sides with convex curvature in the axial direction, and second sides opposite the first sides that extend straight in the axial direction, the race rails being adapted to be assembled in the bearing with selected ones of the sides thereof being directed radially outwardly. Both sides of the race rails may have axially extending guide grooves.

13 Claims, 4 Drawing Figures

ROLLING BEARING INCLUDING LENGTHWISE CONVEX RACE RAILS

BACKGROUND OF THE INVENTION

This invention relates to a rolling bearing for relative lengthwise movement between a shaft and a bearing housing or the like, wherein the housing has a plurality of endless rows of rolling bodies distributed about its circumference. The bearings are held in a cage housing, and the rolling elements, in the rows wherein the balls are loaded, are supported by means of race rails fitted into the bearing housing.

Rolling bearings of this type are known, in which the race rails are provided with convex curvature, in the lengthwise direction of the bearing, on the sides thereof away from the boring of the bearing housing. Such arrangements, as disclosed for example in U.S. Pat. No. 3,545,826 compensate for errors resulting from misalignment of the shaft and boring. Bearings of this type are not suitable for use as components in precision equipment, where stiffness, rigidity and accuracy of the bearings are required, without oscillation of the bearings. Thus, in the above type of bearing, there can be a rocking movement of the bearing housing with respect to the shaft, and such rocking movement results in an unacceptably large yielding or flexing between the shaft and the bearing housing.

In bearings employed for precision machines, another type of bearing must therefore be employed. In such other bearings, which also are known in the state of the art (see DT-PS No. 1,268,442), the radially outer surface of the race rails extend in a staight line in the lengthwise direction of the bearing. This expedient is, of course, suitable in precision machines since there will be essentially no errors resulting from the lack of relative straightness of the shaft relative to the boring of the bearing. As a consequence, in such bearings, it is possible to obtain the necessary stiffness and accuracy, since the race rails are supported along their entire length in the boring of the housing.

These latter rolling bearings have the disadvantage, however, that they are not suitable for use in normal machines having small misalignment between the shaft and the boring, where a certain degree of "rockability" is desired. On the other hand, as discussed above, bearings wherein the race rails have convex curvature in the lengthwise direction in the outer surfaces are not suitable for use in precision equipment, so that differently shaped bearings must be employed for precision equipment. As a consequence, in order to satisfy the different requirements of precision, it is necessary to store a large number of types of bearings, with the consequent increase in the cost of the bearings, as a result of the necessity for storing and producing the differently formed types of bearings.

SUMMARY OF THE INVENTION

The present invention is therefore directed to the provision of an improved rolling bearing of the above type, whereby the same bearing structure may advantageously be employed whether the bearing is to be employed in precision equipment without misalignment, or is to be employed in normal constructions wherein small misalignment may exist between the shaft and the boring of the housing of the bearing.

Briefly stated, in accordance with the invention, the above object is achieved by providing a lengthwise movable bearing wherein one side of each race rail is provided, in the lengthwise direction, with a convex curvature. On the opposite lying side of the race rail, however, the race rail extends straight in the lengthwise direction. Thereby, the race rails may either be inserted with their curved sides facing outwardly in the cage housing, for use in machines having small misalignment between the shaft and the boring of the housing, or the race rails may be provided with their straight edges facing radially outwardly for use in precision equipment wherein the rocking movement of the race rail must be avoided. As a consequence, the present invention provides a lengthwise movable bearing structure that is universally adaptable.

According to an advantageous feature of the invention, the race rails have axially running tracks for the rolling elements, on both sides thereof.

In accordance with a further feature of the invention, both sides of the race rails have radii of curvature, in the plane transverse of the axial direction, which are smaller than or the same as the radius of curvature of the boring of the bearing housing. This relationship simplifies the assembly of the race rails, by enabling the race rails to be readily inserted in either direction in the housing.

Further, in accordance with the invention, axially running holding grooves can be provided on both lengthwise running side edges of the race rails. In this case, holding elements, for example projecting noses, can be provided on the cage housing parts and positioned to extend into and grip the lengthwise running grooves of the race rails. This construction inhibits the race rails from falling out of the housing of the rolling bearing structure.

BRIEF DESCRIPTION OF THE DRAWINGS

In order that the invention will be more clearly understood, it will now be disclosed in greater detail with reference to the accompanying drawings, wherein.

DETAILED DISCLOSURE OF THE INVENTION

Figure 1:
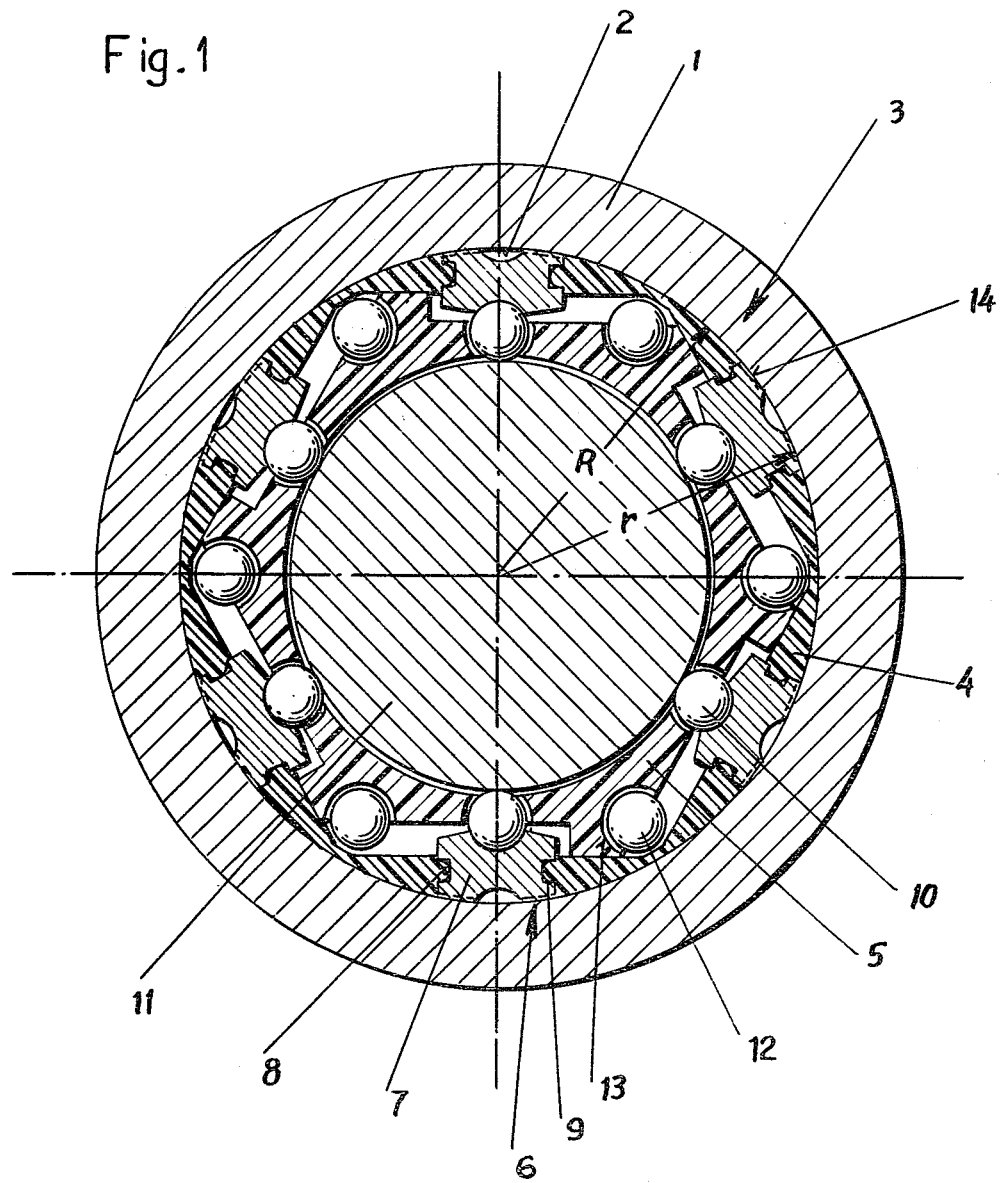
FIG. 1 is a cross-sectional view of a lengthwise movable rolling bearing structure in accordance with the invention, the cross-section being taken transversely of the axial direction of the bearing.

Referring now to the drawings, and in particular to FIG. 1, a lengthwise movable rolling bearing is comprised of a bearing housing 1, having a longitudinally extending boring 2 therein. The bearing structure 3 of the invention is held within the boring 2, and comprises an outer cage part 4 and an inner cage part 5. Each of the cage parts may be produced from plastic. The cage parts and the housing are formed with close fitting tolerances, so that they may be assembled in the conventional manner by axially sliding the elements with respect to one another, to produce the structure illustrated in FIG. 1.

The outer cage part 4 has six openings 6 distributed about its circumference, and the race rails 7 are fitted in these openings, to extend longitudinally of the bearing. The race rails 7 are preferably formed of a material such as steel, and may be radially snapped into the basic cage structure. For this purpose, the sides of the openings 6 of the outer cage part may be provided with circumferentially directed projections or noses 8 in its side walls, the projections 8 extending into the opposite lying axially running holding grooves 9 formed in both sides of the edge walls of the race rails 7. The projections 8 thereby prevent the race rails from falling out of the cage housing structure.

About the structure of the cage arrangement, comprising cage parts 4 and 5, six endless rows of rolling bodies such as balls are provided. The balls 10 under load, of each ball row, may run in a lengthwise direction between the shaft 11 and the corresponding race rail 7, and the unloaded balls 12 run in the return channels 13 formed between the cage parts 4 and 5.

Figure 2:
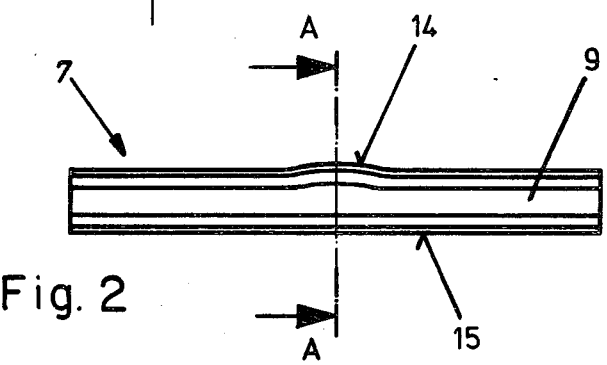
FIG. 2 is a side view of a race rail of the bearing structure of FIG. 1.
Figure 3:
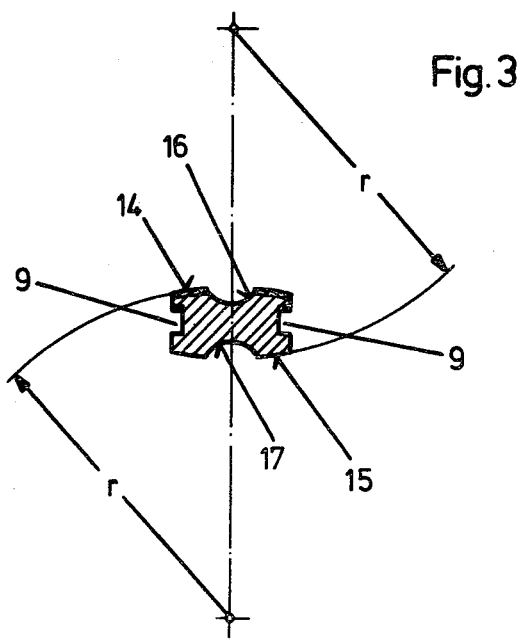
FIG. 3 is a cross-sectional view of the race rail of FIG. 2, taken along the lines A—A.

According to the invention, each race rail 7 has, as is more readily seen in FIGS. 2 and 3, a lengthwise convex curved side 14, and a side 15 opposite the side 14 wherein the race rail is straight in the lengthwise direction. In transverse cross-section, the convex side 14 is curved, having a radius of curvature r, and the opposite side 15 is also curved and has the same radius of curvature r. The radius of curvature r is the same as, or somewhat smaller than the radius of curvature R of the cylindrical boring 2 of the housing, as is apparent in FIGS. 1 and 3. In each race rail 7, a longitudinally extending guide groove 16 is provided on the convex curved side 14, and a longitudinally extending guide groove 17 is provided on the side 15 which extends straight in the longitudinal direction.

In FIG. 1 the race rails are illustrated assembled in the bearing in such an orientation, that the curved outer sides 14 are directed radially outwardly for support against the inner side of the boring 2 of the housing. As a result, the race rails 7 can move with small rocking movement with respect to the straight inner walls in the boring, in order to compensate for small misalignment between the shaft 11 and the boring 2.

Figure 4:
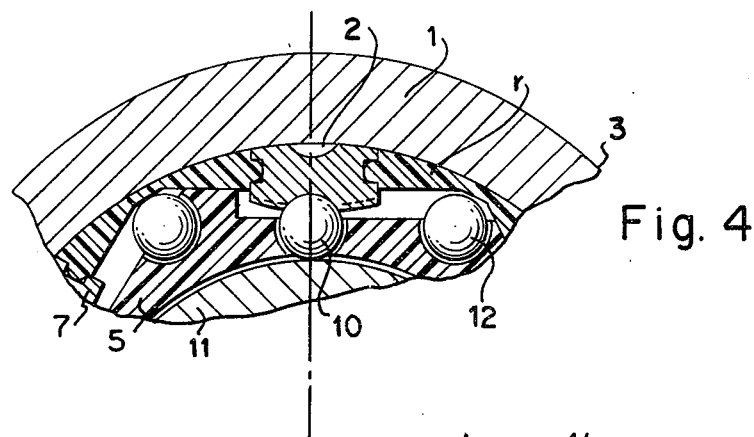
FIG. 4 is a view of a portion of a modification of the bearing structure of FIG. 1, with the race rail reversed.

If the bearing structure 3 is to be employed in precision equipment, without misalignment, then the race rails 7 are rotated from the position illustrated in FIG. 1 to positions wherein their straight running sides 15 are directed radially outwardly as shown in FIG. 4. As a consequence, the straight sides 15 of the race rails are fully supported on the straight inner boring walls of the housing along their whole lengths, so that the bearing may be advantageously employed in precision equipment requiring a stiff bearing structure.

The bearing in accordance with the invention is of course formed with ends having curved raised sections for directing the rolling elements between the portions of the rows under load and the portions of the rows that are not under load. This portion of the bearing may be of conventional construction, and does not form a part of the invention per se.

It will be apparent that the invention is not limited to the above described examples, and its structure may be changed in accordance with the scope of the disclosed invention. For example, instead of having separate cage parts 4 and 5, a correspondingly formed single cage part may be employed. Similarly, the race rail 7 may be provided optionally either with the formed race guide grooves as disclosed, or without such race guide grooves.

What is claimed is:

1. In a rolling bearing for lengthwise movement between the rolling bearing and a shaft, wherein the rolling bearing has a housing with a boring, a plurality of endless rows of rolling elements each having a portion with the rolling elements adapted to be radially loaded, a cage in said boring for guiding said rolling elements, and a plurality of race rails supported by said housing and positioned to radially outwardly support said rolling elements in said portion thereof; the improvement wherein said race rails have first sides with convex curvature in the lengthwise direction and defining first races, and second sides opposite said first sides that are straight in the lengthwise direction, said second sides defining second races, the outer portions of each of said first and second sides, in the circumferential direction, each having convex curvature with a radius substantially equal to the radius of said boring of said housing, whereby said race rails may be assembled in said bearing with either one of said first and second sides facing radially outwardly and engaging said boring of said housing, said race rails each being assembled in said housing with said one side thereof engaging said boring.

2. The rolling bearing of claim 1 wherein said race rails have axially extending guide grooves on said first and second sides.

3. The rolling bearing of claim 1 wherein said race rails have side edges between said first and second sides thereof, said side edges having recesses, and wherein said cage has projections extending into said recesses for inhibiting said race rails from separation from said cage.

4. The rolling bearing of claim 3 wherein said recesses are longitudinally extending grooves.

5. The rolling bearing of claim 1 wherein said cage has axially extending openings distributed about its outer periphery, said cage being assembled in said boring of said housing, said race rails extending axially in said openings and engaging the inner surface of said boring for radial support.

6. The rolling bearing of claim 5 wherein the inner walls of said boring are axially straight.

7. The rolling bearing of claim 5 wherein said cage is comprised of separable inner and outer portions.

8. The rolling bearing of claim 5 wherein said cage has radially inwardly extending slots aligned with said race rails, whereby portions of said rolling elements extend through said slots for engaging said shaft in the portions of said endless rows adapted to be radially loaded.

9. The rolling bearing of claim 5 wherein each of said first and second sides of said race rails has a longitudinally extending groove for defining a guide groove for guiding said balls, whereby said race rails may be selectively inserted within said boring with either of said first and second sides extending radially outwardly.

10. In a rolling bearing for lengthwise movement between the rolling bearing and a shaft, wherein the rolling bearing is a housing with a boring, a plurality of endless rows of the rolling elements each having a portion with the rolling elements adapted to be radially loaded, a cage in said boring for guiding said rolling elements, and a plurality of race rails radially supported by said housing and positioned to radially outwardly support said rolling elements in said portion thereof; the improvement wherein said race rails have first sides with convex curvature in the lengthwise direction and second sides opposite said first sides that are straight in the lengthwise direction, said race rails further having axially extending guide grooves on said first and second sides respectively, and defining first and second races respectively, for receiving rolling elements, the outer portions of each of said sides, in the circumferential direction, each having convex curvature with a radius of curvature substantially equal to that of said boring, whereby the race rails may be positioned in said rolling bearing with either of said first and second sides facing radially outwardly.

11. The rolling bearing of claim 10, wherein said rolling elements are balls, and said grooves have arcuate transverse shapes corresponding to the curvature of said balls.

12. In a rolling bearing for lengthwise movement between the rolling bearing and a shaft, wherein the rolling bearing has a housing with a boring, a plurality of endless rows of rolling elements each having a portion with the rolling elements adapted to be radially loaded, a cage in said boring for guiding said rolling elements, and a plurality of race rails supported by said housing and positioned to radially outwardly support said rolling elements in said portion thereof; the improvement wherein said race rails have first sides with convex curvature in the lengthwise direction and defining first races, second sides opposite said first sides that are straight in the lengthwise direction, said second sides defining second races, and first and second side edges joining said first and second sides, said edges shaped to hold said race rails radially in said rolling bearing while permitting assembly of said race rails in said rolling bearing with either of said first and second sides facing radially outwardly, the outer portions of said first and second sides each having convex curvature in transverse planes, with radii of curvature substantially equal to that of said boring, whereby said bearing may be assembled with either of said sides supported by said housing.

13. The rolling bearing of claim 12, wherein said edges of said race rails are shaped with longitudinally extending grooves formed to permit assembly of said race rails with either of said first and second side facing radially outwardly and engaging said boring of said housing.

* * * * *

UNITED STATES PATENT AND TRADEMARK OFFICE
CERTIFICATE OF CORRECTION

PATENT NO. : 4,138,167
DATED : February 6, 1979
INVENTOR(S) : Horst M. Ernst et al It is certified that error appears in the above-identified patent and that said Letters Patent are hereby corrected as shown below:

In the abstract, lines 5-6, After "postions of the" remove --portions of the lengths of the--.

Column 1, line 11, after ", in the" insert --portions of the lengths of the--.

Signed and Sealed this

Twenty-second Day of May 1979

[SEAL]

Attest:

RUTH C. MASON
Attesting Officer

DONALD W. BANNER
Commissioner of Patents and Trademarks